May 22, 1962 D. D. WINETEER 3,035,812
VEHICLE TOWING DOLLY
Filed Dec. 22, 1959 2 Sheets-Sheet 1
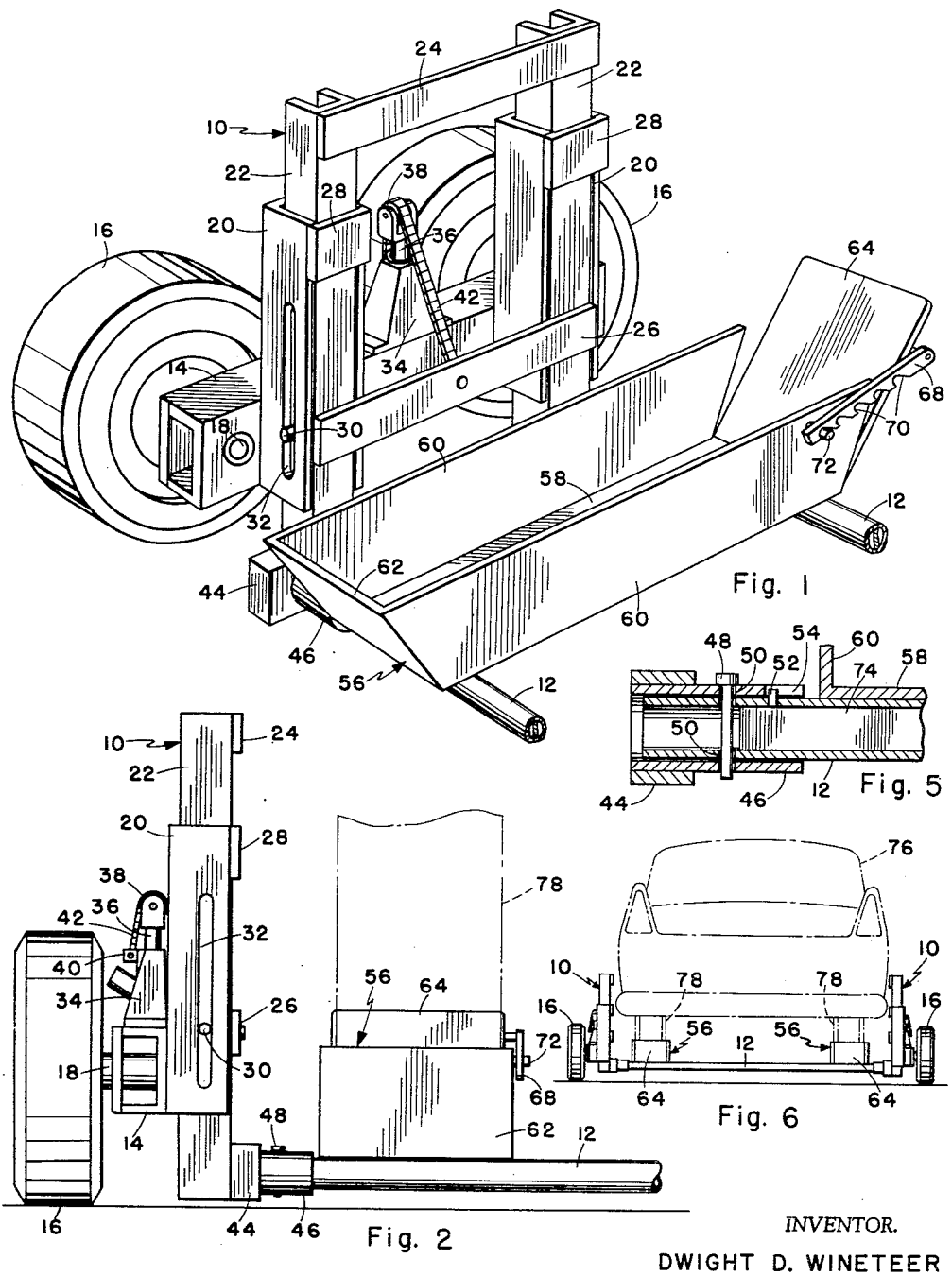
INVENTOR.
DWIGHT D. WINETEER
BY Knox & Knox May 22, 1962 — D. D. WINETEER — 3,035,812
VEHICLE TOWING DOLLY
Filed Dec. 22, 1959 — 2 Sheets-Sheet 2

INVENTOR.
DWIGHT D. WINETEER
BY
Knox & Knox

United States Patent Office 3,035,812
Patented May 22, 1962

3,035,812
VEHICLE TOWING DOLLY
Dwight D. Wineteer, 3583 Citrus, Lemon Grove, Calif.
Filed Dec. 22, 1959, Ser. No. 861,340
2 Claims. (Cl. 254—2)

The present invention relates generally to wheel lifting means and more particularly to vehicle towing dolly.

The primary object of this invention is to provide a towing dolly which can be easily and quickly assembled and positioned under the wheels of a vehicle to raise either end of the vehicle for towing, the wheels being held securely in cradles to prevent inadvertent displacement.

Another object of this invention is to provide a towing dolly in which the wheel holding cradles have ramps to facilitate loading of the vehicle onto the dolly, the ramps swinging upwardly and being adjustably securable to hold various sizes of wheels in the cradles.

Still another object of this invention is to provide a towing dolly having readily accessible jacks to raise the vehicle to the required height for proper road clearance while towing.

A further object of this invention is to provide a towing dolly which can be dismantled without tools, for storage or transportation in a minimum of space.

Finally, it is an object to provide a vehicle towing dolly of the aforementioned character which is simple, safe and convenient to use and which will give generally efficient and durable service.

Figure 3:
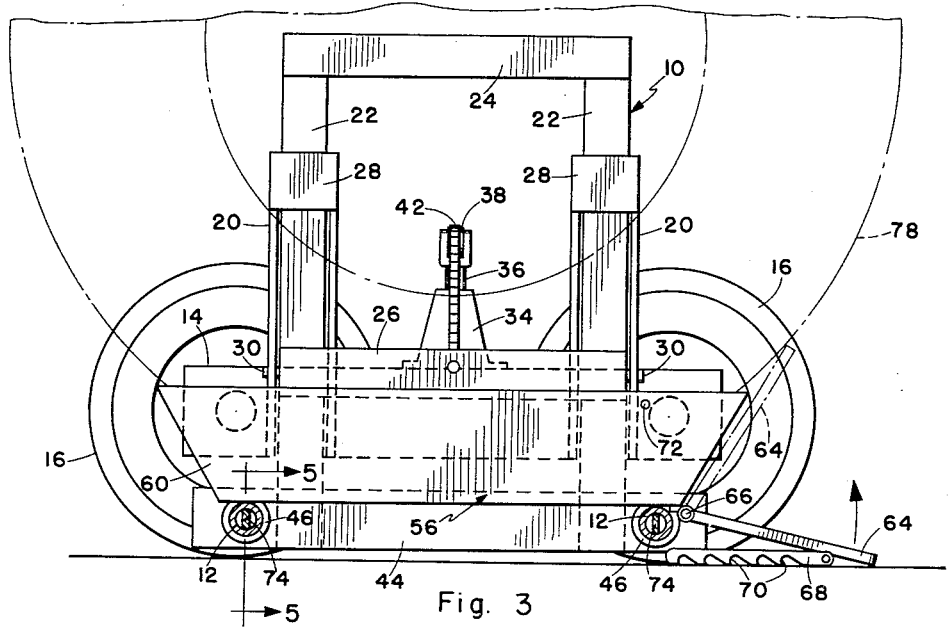
Figure 4:
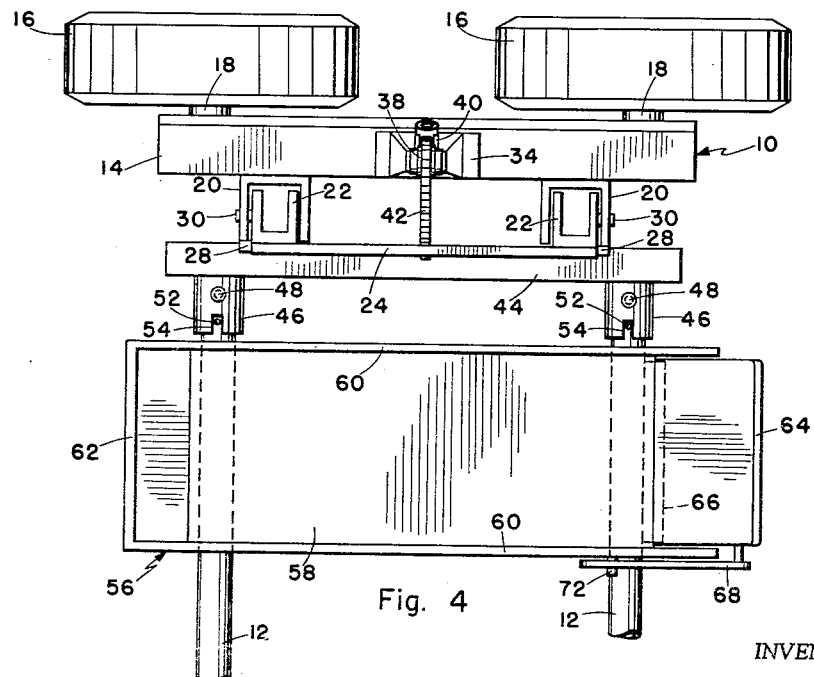

With these and other objects definitely in view, this invention consists in the novel construction, combination, and arrangement of elements and portions, as will be hereinafter fully described in the specification, particularly pointed out in the claims, and illustrated in the drawings which form a material part of this disclosure, and in which:

FIGURE 1 is a perspective view of one dolly unit;
FIGURE 2 is an end elevation view thereof;
FIGURE 3 is a side elevation view of the dolly unit;
FIGURE 4 is a top plan view thereof;
FIGURE 5 is an enlarged fragmentary sectional view taken on the line 5—5 of FIGURE 3; and
FIGURE 6 is an end elevation view on a reduced scale, of the complete dolly assembly, a vehicle being indicated in broken line.

Similar characters of reference indicate similar or identical elements and portions throughout the specification and throughout the views of the drawings.

The towing dolly comprises a pair of dolly units 10 interconnected by cross bars 12, the dolly units being installed under two wheels of a vehicle with the cross bars passing under the vehicle between the wheels, as in FIGURE 6. One dolly unit 10 is illustrated and described in detail, the other being similar in all respects.

The basic dolly unit 10 comprises a support beam 14, preferably of rigid box construction, on which are mounted a pair of freely rotatable dolly wheels 16 on stub axles 18 extending from one side of the beam. Fixed to the other side of the support beam 14, adjacent the opposite ends thereof, are two upright, parallel guide channels 20, open on the side remote from the support beam. Slidably mounted in the guide channels 20 are two posts 22, interconnected at the upper ends by a tie bar 24 and adjacent the lower ends by a further tie bar 26. The posts 22 are held in place by retaining plates 28 fixed across the upper ends of guide channels 20 and by laterally extending guide pins 30 fixed to the posts and riding in vertically elongated slots 32 in said guide channels.

Fixed on the support beam 14 between the guide channels 20 is a jack 34 of conventional type, having an actuating rod 36 on the upper end of which is a roller 38. The jack 34 has a lug 40 to which is fixed one end of a lifting chain 42, said chain passing over the roller 38 and being secured at the other end to the bar 26. Thus by operating the jack to raise the actuating rod 36, the posts 22 are lifted a distance twice that of the actuating rod, due to the doubling of the chain 42 over roller 38.

Interconnecting the lower ends of the posts 22 is a generally horizontal connecting bar 44, having a pair of short, cylindrical sleeves 46 fixed adjacent the ends thereof, said sleeves extending parallel to each other on the side of the tie bar remote from the wheels 16. The sleeves 46 receive the ends of cross bars 12 and are of sufficient length to provide a rigid connection, said cross bars being locked in place by locking pins 48 which are inserted through diametrically opposed openings 50 in the sleeves and cross bars. To ensure proper alignment and location, each cross bar 12 has a radially outwardly projecting stop pin 52 which seats in a notch 54 in the surrounding sleeve 46, as in FIGURES 4 and 5.

Mounted on the cross bars 12 adjacent the ends thereof are wheel supporting cradles 56, each having a base plate 58, side plates 60, a fixed, angularly disposed front plate 62 and a ramp 64 connected at its lower end to the base plate by means of a hinge 66. Pivotally attached to each ramp 64 adjacent the outer end thereof is a retaining arm 68 having a plurality of longitudinally spaced notches 70, which are selectively engageable with a fixed retaining pin 72 on one side plate 60. The cradles 56 can be fixed to the cross bars 12 for simplicity, the cross bars being made in sets of different lengths for narrow or wide tread vehicles. Alternatively, the cross bars may be telescopically adjustable and the cradles can be made adjustable by means of suitable clamps, but this requires additional manipulation to fit a particular vehicle. Since the dolly is often used in the vicinity of passing traffic, a minimum of adjustment is desirable and vehicles are sufficiently standardized as to wheel tread to ensure proper accommodation of all vehicles by two or perhaps three sets of cross bars with attached cradles. In fact, the cradles 56 may be of sufficient width to allow for a reasonable variation in wheel tread. For additional rigidity the cross bars 12 may be reinforced by internal web plates 74 extending vertically diametrically throughout the length of the tubular cross bars, resulting in maximum strength with minimum weight.

In use, the cross bars 12 are placed under the vehicle, indicated at 76 in FIGURE 6, ahead of the wheels 78 in the proposed direction of travel, the ramps 64 being lowered in the position illustrated in full line in FIGURE 3. The dolly units 10 are then attached to the cross bars 12 and secured by locking pins 48. The posts 22 are lowered to allow the connecting bars 44 to rest on the ground and the vehicle is pulled forwardly so that the wheels 78 roll up the ramps 64 into the cradles 56. The ramps 64 are then raised into contact with the wheels 78, as indicated in broken line in FIGURE 3, and secured by engaging the retaining arms 68 on the retaining pins 72, thus holding the wheels in place. Due to the range of adjustment of the retaining arms 68, various sizes of wheels can be properly held against shifting, even with flat tires. The frictional contact of the connecting bars 44 with the ground prevents the dolly from shifting while the vehicle is being loaded.

When the vehicle is in place, the jacks 34 are actuated to raise the cross bars 12 clear of the ground, allowing the dolly to roll, the vehicle being towed in the normal manner. The dolly may be used under the front or rear wheels of a vehicle according to requirements, the weight of the vehicle being sufficient to hold the wheels in the enclosed cradles 56 during towing, without the need for clamps or ties, other than the usual safety connection between the towed vehicle and the tow truck.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A towing dolly, comprising: a pair of similar dolly units each having a rigid support beam, a single pair of longitudinally aligned dolly wheels freely rotatably mounted on said support beam, a pair of fixed, upright guides extending upwardly from said support beam, a pair of posts vertically slidably mounted in said guides, and a connecting bar fixed between the lower ends of said posts; jack means mounted on said support beam and operatively coupled to said posts to individually raise and lower each pair of posts to an individually controlled height; a pair of identical unitary cross bars terminally secured to said connecting bars and interconnecting said dolly units in spaced relation; and vehicle wheel receiving cradles mounted on said cross bars inboard of respective pairs of aligned wheels, said cradles each having spaced, parallel side plates; a fixed front plate at one end between said side plates; and a ramp portion pivotally mounted between said side plates at the other end thereof; said ramp portions being movable to a downwardly inclined ramp position and a plurality of raised wheel engaging positions; and retaining means connected to said ramps to hold the ramps in any one of said wheel engaging positions.

2. A towing dolly, comprising: a pair of similar dolly units each having a single rigid beam, a single pair of longitudinally aligned dolly wheels freely rotatably mounted on said single beam, a pair of fixed, upright substantially rectangular guides extending upwardly from said single beam, a pair of posts vertically slidably mounted in said guides, and a connecting bar connecting the lower ends of said posts; a pair of spaced, axially parallel sleeves fixed to and extending transversely from said connecting bar; a pair of identical unitary, rigid cross bars terminally inserted in said sleeves and interconnecting said pair of dolly units in spaced relation; locking means detachably securing said cross bars in said sleeves; a pair of vehicle wheel receiving cradles mounted on said cross bars inboard of respective pairs of said aligned dolly wheels, said cradles each having a ramp portion pivotally attached thereto and selectively movable to an inclined wheel ramp position and to a raised wheel engaging position, jack means mounted on said beam for lowering said posts, said connecting bar, and said cross bar until said connecting bar rests on the ground, whereby friction between said connecting bar and the ground locks said dolly in place while the vehicle's wheels are driven up said ramp and said jack means for raising the individual wheels of said vehicle an individual height off the ground, whereby said vehicle's weight is then supported by said dolly wheels, and said vehicle and dolly may then be towed away.

References Cited in the file of this patent

UNITED STATES PATENTS

| | | |
|---|---|---|
| 1,224,574 | Sessions | May 1, 1917 |
| 1,261,681 | Barnett | Apr. 2, 1918 |
| 1,871,180 | Kegresse | Aug. 9, 1932 |
| 2,259,399 | Sutter | Oct. 14, 1941 |
| 2,326,684 | Ross | Aug. 10, 1943 |
| 2,391,503 | Page | Dec. 25, 1945 |
| 2,455,432 | Martin | Dec. 7, 1948 |
| 2,467,500 | Salter | Apr. 19, 1949 |
| 2,727,638 | Sestan | Dec. 20, 1955 |